United States Patent [19]

Levy

[11] Patent Number: 5,740,397
[45] Date of Patent: Apr. 14, 1998

[54] IDE DISK DRIVE ADAPTER FOR COMPUTER BACKUP AND FAULT TOLERANCE

[75] Inventor: Itzik Levy, Hollywood, Fla.

[73] Assignee: ARCO Computer Products, Inc., Hollywood, Fla.

[21] Appl. No.: 540,765

[22] Filed: Oct. 11, 1995

[51] Int. Cl.$^6$ ................................................ G06F 11/16
[52] U.S. Cl. .................................. 395/441; 395/182.04
[58] Field of Search ............................ 395/441, 182.04

[56] References Cited

U.S. PATENT DOCUMENTS

| | | |
|---|---|---|
| 4,213,177 | 7/1980 | Schmidt . |
| 4,989,205 | 1/1991 | Dunphy, Jr. et al. . |
| 4,989,206 | 1/1991 | Dunphy, Jr. et al. . |
| 5,051,887 | 9/1991 | Berger et al. . |
| 5,167,032 | 11/1992 | Martin et al. . |
| 5,185,884 | 2/1993 | Martin et al. . |
| 5,212,784 | 5/1993 | Sparks . |
| 5,239,659 | 8/1993 | Rudeseal et al. . |
| 5,303,244 | 4/1994 | Watson . |
| 5,333,277 | 7/1994 | Searls . |
| 5,345,565 | 9/1994 | Jibbe et al. . |
| 5,379,417 | 1/1995 | Lui et al. . |
| 5,390,327 | 2/1995 | Lubbers et al. . |
| 5,392,244 | 2/1995 | Jacobson et al. . |
| 5,408,634 | 4/1995 | Joho . |
| 5,418,925 | 5/1995 | DeMoss et al. . |

OTHER PUBLICATIONS

Wong, Willaim, PC Upgrade, "How to Build Your Own Raid Drive–Array System", vol. 6, No. 2, Jun. 1997.
Silicon Valley Computer—IDE Mirror Controller Card for IBM AT, 286, 386 & 486 Compatible Systems, User Manual, Copyright 1992 by Silicon Valley Computer.

Advertisement for GSI Model 11, GSI Model 18 and GSI Model 21 Accelerator Boards by GSI Inc. and bearing a Copyright date of 1993–1994 (1 page).

Silicon Valley Computer advertisement bearing a date of Jan. 21, 1994.

CompuTechnology Group press release bearing a date of Apr. 18, 1993 (3 pages).

DC Series User's Manual, IDE E–Z Raid–1, Feb. 28, 1994.

Coffee, Peter, "Micron PC redresses Pentium faluts; video disk subsystems give PowerStation strong showing across benchmark suite." PC Week, Ziff–Davis Publishing Company, Feb. 28, 1994.

Primary Examiner—Jack B. Harvey
Assistant Examiner—Jigar Pancholi
Attorney, Agent, or Firm—Loeb & Loeb LLP

[57] ABSTRACT

An adapter for use in a computer system having an IDE interface controller and a plurality of drives. The adapter is connected to the IDE controller and the plurality of drives and monitors information transmitted between the IDE interface controller and the plurality of drives. The adapter determines whether each of the plurality of drives is serviceable and whether data on each of the plurality of drives are equal. Identical data is directed to each of the plurality of drives when data on each of the plurality of drives are equal. Data is prevented from being directed to at least one of the plurality of drives when data on each of the plurality of drives are not equal. One of the plurality of drives is selected as a drive from which to read data.

7 Claims, 5 Drawing Sheets

IDE DISK DRIVE ADAPTER FOR COMPUTER BACKUP AND FAULT TOLERANCE

FIELD OF THE INVENTION

The present invention relates to a disk drive adapter for a computer system and, in particular, to an inexpensive high performance, high reliability Integrated Drive Electronics (IDE) disk drive adapter for use with a computer system.

BACKGROUND OF THE INVENTION

A problem which exists in the field of computer systems is the provision of low cost, fault tolerant, high performance, high reliability Integrated Drive Electronics (IDE) storage with backup capability. This problem is further complicated by the present use of a variety of different computer bus architectures, requiring different adapters with specific connectors to be compatible with the varying bus expansion slots. To date, the inventor is unaware of any single design which accomplishes all the capabilities of a disk drive adapter across the complete spectrum of the many different bus architectures presently in use.

Computer systems store data on hard disk drives. Generally, the computer stores data by writing the entire data file onto a single disk drive. A hard disk controller or adapter provides the logical link between the hard drive and the other peripherals attached to the computer. The hard disk controller reacts to requests from a Central Processing Unit (CPU) by sending seek, read, write and control signals to the drive and must integrate and control the flow of data. The failure of a single disk drive can result in the loss of a significant amount of data. In order to minimize the possibility of such data loss, hard disk drives are built to be highly reliable units. Nevertheless, disk crashes still occur.

The speed, reliability, and processing capability of computer systems are constantly being improved, thereby allowing users to handle more complex and sophisticated applications. Such improvements in computers impose greater performance and reliability demands on mass storage and Input/Output (I/O) devices. The mass storage industry has sought to improve I/O performance and to provide access to stored data at levels of high reliability. See, for example, *The RAID Book: A Source Book for RAID Technology*, published Jun. 9, 1993, by the RAID Advisory Board, Line Lakes, Minn.

As personal computers have become more of a mass market product, storage devices are required which meet these goals in a cost-effective manner. Designers of mass storage systems seek to optimize cost per megabit, performance, and high data availability.

The performance of present hard disk I/O systems including the hard disk controllers is limited. Data stored on hard disks is located by the comparatively slow process of seeking and disk rotation related to the data requests. Because the hard disk drive is a mechanical device, it is an inherently slower and less reliable component than one based on a solid state design, such as a computer circuit board.

High data availability is the ability to recover data stored in the storage system even though some of the data has become inaccessible due to disk failure or some other reason, and the ability to assure operation in the event of such failure. When data becomes unavailable or the data stored on the disk drive is lost, such occurrence can cause a significant disruption in the operation of the personal computer and the business of the operator, thereby creating the need for fault tolerant solutions.

Present computer technology recognizes several solutions to disk fault tolerance. Two methods of storing redundant data are most commonly used. According to the first method, which may be referred to as the "mirror" method, data is duplicated and stored in two separate areas of the storage system. For example, a computer system that uses disk mirroring keeps identical copies of data on a pair of disk units designated as mirrors of one another. If one disk unit in a mirrored pair fails, the system can use the copy of the data on the other unit of that mirrored pair, until the broken unit is repaired or replaced and its copy of the data is rebuilt.

Generally, this method is described as the "RAID" 1 system. The term "RAID" (Redundant Array of Independent Disks) means a disk array in which part of the physical storage capacity is used to store information about user data. The redundant information enables regeneration of user data in the event that one of the array's member disks or the access path to it fails. A more detailed discussion of RAID systems is found in a book entitled, *The RAID Book: A Source Book for RAID Technology*, published Jun. 9, 1993, by the RAID Advisory Board, Lino Lakes Minn.

RAID level 1, or disk mirroring, offers the highest data reliability by providing one to one protection in that every bit of data is duplicated and stored within the storage system. This activity occurs automatically as data is input into the system. The ability of a mirrored storage system to protect against situations where data can not be accessed (such as when data is destroyed due to a head crash or when data is temporarily unavailable due to a component failure) and the way the automatic switch between a failed drive and a good drive occurs, is directly related to the way the hardware is connected, the way the disk units are arranged in mirrored pairs, and often is dependent on specific software.

In the second or "parity" method (associated with RAID levels 2-5), a portion of the storage area is used to store redundant data, but the size of the redundant storage area is less than the remaining storage space used to store the original data.

Other arrangements include backing up only the most critical data stored on the disk drive, or periodically backing up the data that is stored on the disk drive by storing it on a much less expensive data storage unit that also has a much slower data retrieval access time.

When backup systems utilize technologies other than hard disk drives, these other arrangements may not offer the same high level of confidence of data integrity because the media surface may be exposed to outside contamination rather than being self contained, such as a disk drive (which is hermetically sealed). These non-mirroring arrangements usually also require the computer to be dedicated to a non-productive task (backup), directly opposing the purpose of the computer which is to increase and/or enhance productivity. Further, if the back up media is not rigid (for example, if the back up is made on magnetic tape), then it is subject to stretching and other related deficiencies. These conditions, combined with the continuing reduction of fixed disk cost, delineate backup functioning as a dedicated task vs. backup as an non-dedicated task, with dedicated being antiquated and not a cost efficient method of data protection.

Present personal computer technology recognizes several hard disk drive storage interfaces, including, for example: ST506/412, ESDI, SCSI, IDE, ATA, ATA-2 and EIDE. While all of these interfaces are available to manufacturers in the personal computer industry, the most commonly used interfaces are the Small Computer System Interface (SCSI) and the Integrated Drive Electronics/Enhanced Integrated Drive Electronics (IDE/EIDE).

There are significant differences between SCSI technology and IDE technology in terms of design, speed, and cost.

SCSI, based on an original design by Shugart Associates, is a method of allowing different devices to communicate within a PC. The entire controller is built on the component PCB. Fully integrated, parallel data is transferred to and from a PC by way of a single cable through a bus interface that has configured a disk drive device. The SCSI interface communicates to the host computer via a protocol which allows multiple types of devices (printers, drives, tape backup, scanners, etc.) to connect and function together. SCSI implementations include disk drives, tape, printers, removable drives and many other peripherals.

In comparison, IDE (a technology developed originally by Compaq and Conner) relies on the register level command sent by the computer using INT 13 routines. Communications between the drive and the controller flow on a 40 pin flat cable. IDE is a relatively simple interface.

SCSI hard disk drives are considerably more expensive than IDE hard disk drives. SCSI adapters are also more expensive than IDE adapters. Though the description above only briefly highlights some differences between the IDE and SCSI interfaces, they are considered very different for a technical implementation. One can not connect a SCSI adapter to an IDE drive, or vice versa.

The mirroring of information into two or more disk units requires an expert understanding of the physical connections of the hardware, so that the hardware path from the disk units to the system can be duplicated (or mirrored) and to ensure a high degree of protection by reducing the number of single hardware failure points. Pairing up disk units must take into account other system and mirroring restrictions, such as compatibility with operating systems, bus technology, conflicting software, assuring that the disk units of a mirrored pair are independently operational, etc. Pairing of disk units for mirroring is difficult, time consuming, and error-prone. It can frequently result in invalid configurations, or configurations of less than optimal pairing and protection.

There are several bus technologies utilized in personal computer systems, for example: ISA, VESA local bus, EISA, PCI local bus, and MCA. There is no single IDE mirroring solution that applies to all such bus technologies. Each mirroring solution requires a dedicated hardware design and related software. Consequently, the few existing adapters used to mirror information under existing designs must act as the initial IDE connector to the system bus via an expansion slot of specific design or a connector on the bus. A PCI adapter will only fit a PCI bus, a VL-bus adapter will only fit a VL-bus, etc.

It is an object of the present invention to provide a hardware solution to the problem of optimal mirroring while achieving higher performance, higher data availability, and lower cost.

It is another object of the present invention to enable the implementation of substantially automatic, substantially instantaneous RAID 2 disk mirroring under IDE or EIDE, thereby providing a mirroring data protection scheme which is less expensive than under SCSI.

It is another object of the present invention to prevent downtime when a disk failure occurs.

It is another object of the present invention to provide a disk drive adapter designed to function as an intermediate adapter, connectable to an existing IDE connector, thereby eliminating the need to use an expansion slot.

It is another object of the present invention to provide a disk drive adapter designed to function with any operating system presently available on the market (such as DOS, Windows, UNIX, Novell, OS/2) or any future operating system which supports the IDE interface.

SUMMARY OF THE INVENTION

In accordance with the present invention, these and other objectives are achieved by providing a computer system generally containing a disk drive adapter (a preferred embodiment of which is referred to herein as MIR-95) connected to an IDE disk controller. The IDE disk controller is connected to a bus. The computer may have one of a variety of different buses. A disk drive adapter in accordance with the present invention is designed to be connected directly between the IDE interface controller (hereinafter also referred to as the IDE host or IDE host controller) and at least two different hard drives. The IDE host adapter may be in the form of any IDE adapter, any IDE connector provided by a system board, or any external IDE interface. Information will therefore flow between the disk drive adapter in accordance with the present invention and the mirrored pair of hard disk drives via the IDE disk controller. Use of the adapter in this configuration will allow the user to keep the existing IDE disk controller, protecting the hardware investment.

A disk drive adapter in accordance with the present invention is thereby designed to function as an intermediate adapter, connectable to an existing IDE connector, thereby eliminating the need to use an expansion slot. This design allows the user to keep the existing controller, around which all drivers and applications are installed. Since there is no need to use an expansion slot, the bus technology of the particular computer becomes irrelevant. This allows for functionality by one adapter, regardless of the bus type.

The present invention offers a RAID1 (disk mirroring) solution to all existing and future systems using the IDE interface without requiring dedicated software. Data mirroring into two or more different drives attached to the disk drive adapter is obtained substantially as the data is written, without adding extra device transfer time beyond that required to find the desired disk area on each of the drives. In the event that one of the drives fails, the disk drive adapter is capable of immediately switching all operations to an alternative, working drive without requiring user intervention. A drive failure will therefore not require data reconstruction. In a preferred embodiment the invention can mirror information between channels from two to four drives, which represents the current IDE limitation due to definition and cable connectors. However, if the ability of IDE were to increase the number of drives on the IDE channel, then present invention would also be able to address the increased number of drives.

A disk drive adapter in accordance with the present invention is thereby capable of providing IDE disk mirroring to at least two identical or non-identical drives, independent of computer model, operating system or bus technology. The user may choose between reading data from the first drive, or reading data from the second drive, or sharing the reading of data between both drives.

The disk drive adapter may be configured to occupy a 3.5" floppy disk bay in the computer or a 5.25" floppy disk bay. Alternatively, the disk drive adapter may be configured to use one of the ISA slots next to the initial IDE connector for power and maintenance capabilities.

The user interface may consist of a serial channel or a front panel display and keypad. The disk drive adapter may be configured to indicate a drive failure visually or audibly, thereby allow the user to schedule required maintenance.

BRIEF DESCRIPTION OF THE DRAWINGS

A detailed description of a preferred embodiment of the present invention will be made with reference to the accompanying drawings.

DETAILED DESCRIPTION OF THE PREFERRED EMBODIMENTS

The following detailed description is of the best presently contemplated mode of carrying out the invention. This description is not to be taken in a limiting sense, but is made merely for the purpose of illustrating the general principles of the invention. The scope of the invention is best defined by the appended claims.

Figure 1:
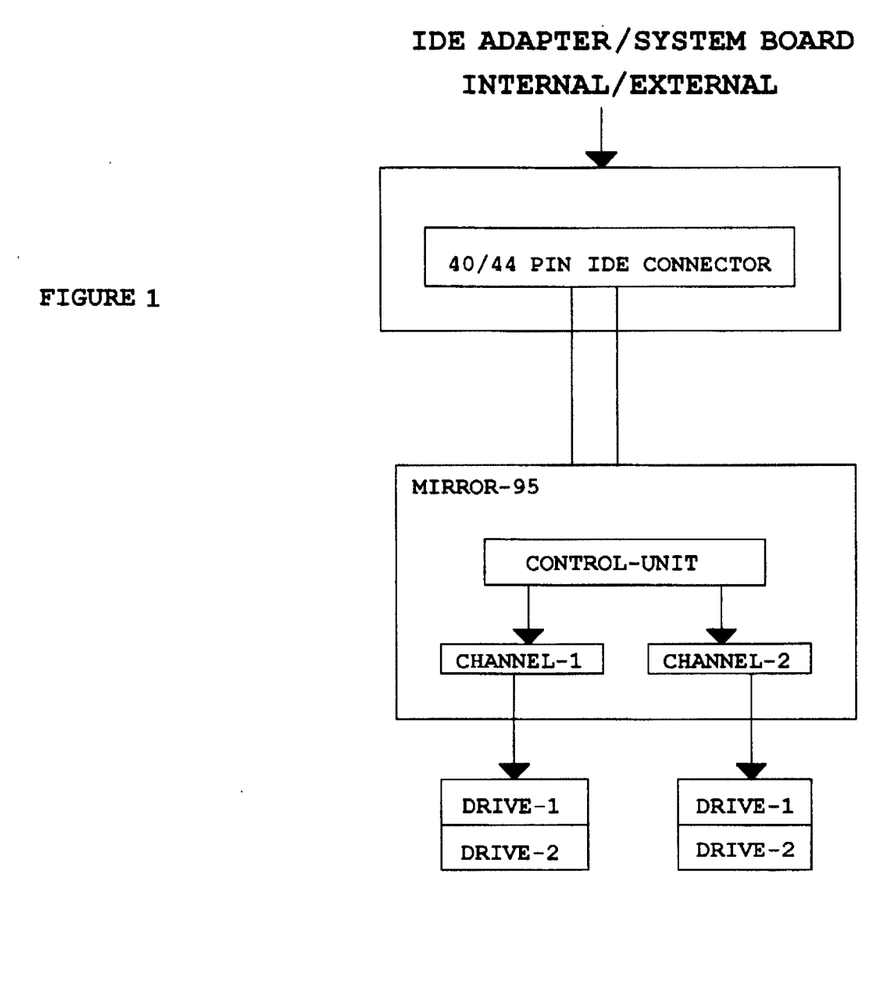
FIG. 1 shows an example of a disk drive adapter in accordance with the present invention connected to two hard disk drives and an IDE adapter/system board via a standard 40/44 pin IDE connector.
Figure 2:
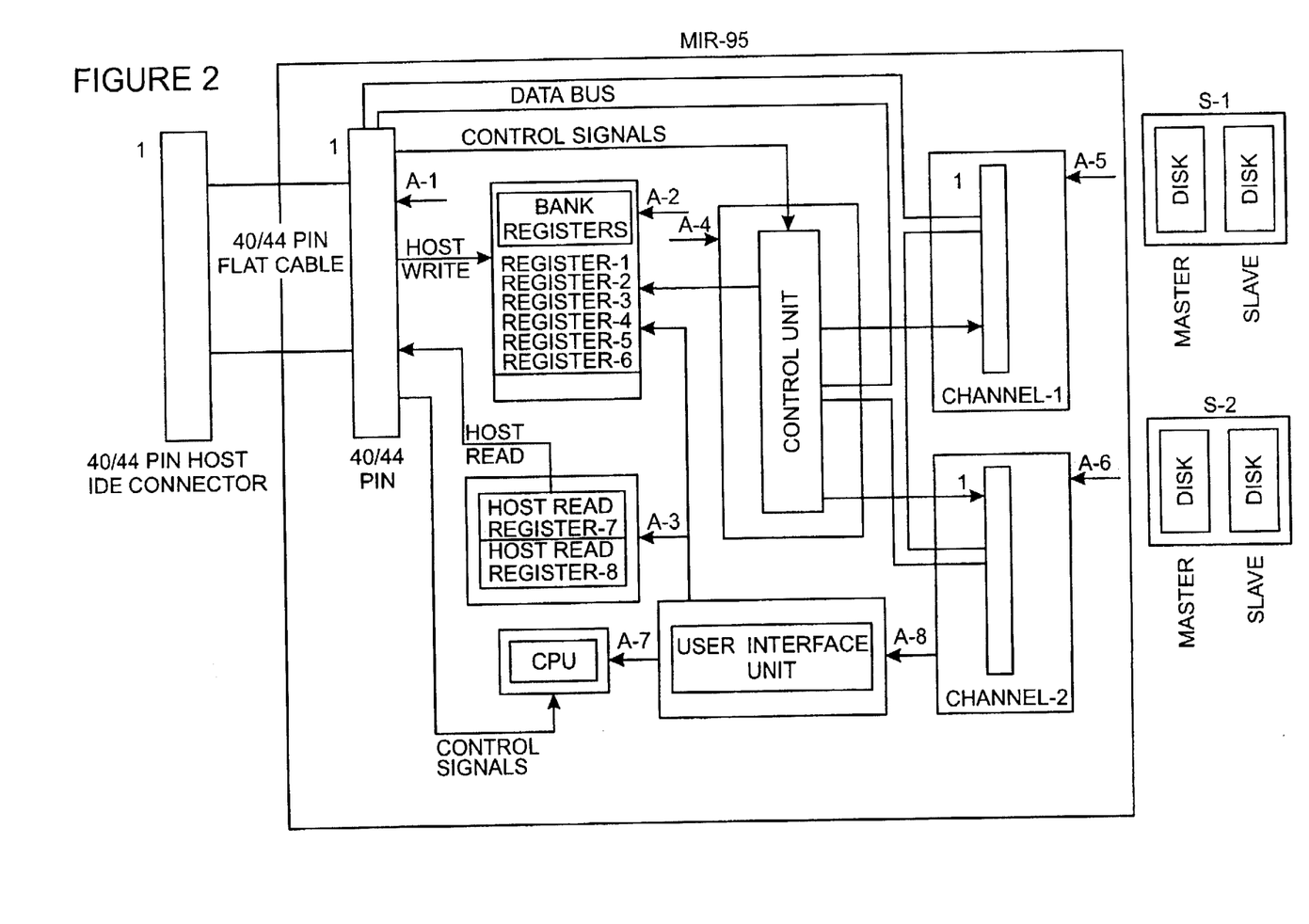
FIG. 2 shows an example of the detailed hardware configuration of the disk drive adapter shown in FIG. 1.

FIGS. 1 and 2 show an example of a disk drive device or adapter MIR-95 in accordance with the present invention connected via a first channel to a first drive (comprising a master and slave drive) and via a second channel to a second drive (also comprising a master and slave drive) as well as to an IDE host adapter/system board (not illustrated). In the illustrated embodiment the connection between the disk drive adapter MIR-95 and the IDE host adapter board is via a standard 40/44 pin IDE connector A-1 and associated flat cable.

Element A-2 represents a first register stack. In the illustrated embodiment, six registers are provided for capturing disk transfer information as the information is being written to the drive registers. Logic in the disk drive adapter (referred to herein as MIR-95) will elect one of the drives from which to read data. Data read by the host adapter will come directly from the elected drive. The logic may be provided by a chip, such as the Altera PLD EPM8032 or EPM8232, for example. Standard TTL Logic may be provided by the 74F245, 74LS373 or 74F04.

Element A-3 represents a second register stack including a seventh and eighth register. These registers accept the command register data sent by the host adapter and provide the status register information that is read by the host adapter. A control unit A-4 is provided for monitoring drive operations, selecting the drive to provide data to be read by the host adapter, and provide the user interface for error indication and device configuration. In the illustrated embodiment, a first or primary channel A-5 supports both a first master drive and a first slave drive. A second or mirrored channel A-6 supports both a second master drive and a second slave drive, making a combined total of four drives. The function of monitoring the operation of the drives and controlling the user interface are performed by a microcontroller A-7. Element A-8 represents a user interface unit which allows a user to configure the disk drive adapter MIR-95 and monitor the status of the first hard drive or the second hard drive.

Start up

Each time the computer is started, a check is made by the disk drive adapter MIR-95 to determine the serviceability of the first hard disk drive and the second hard disk drive. This may be accomplished in the following manner: The disk drive adapter MIR-95 has a first channel through which information may be transmitted to the first disk drive and a second channel through which information may be transmitted to the second hard disk drive. During start up of the computer, the disk drive adapter MIR-95 scans both the first channel and the second channel to determine the number of hard drives attached to each of the two channels. If only a single channel is used, then all disk operations will be directed to that channel. If both channels are used, then the disk drive adapter MIR-95 will analyze the hard drives to determine the geometry of the drives (cylinders, heads, and sectors). After determining the geometry of the drives, the disk drive adapter MIR-95 will determine if the user has specified mirroring operation and will then set up the system accordingly.

Normal Operations

Under normal operations, data transmitted by the computer's CPU will be directed to the host adapter. As the disk drive adapter MIR-95 will be connected to the host adapter, all information received by the host adapter (such as drive, track, sector, transfer size, etc.) will consequently also be received and analyzed by the disk drive adapter MIR-95. After the host adapter provides this information, the host adapter will issue a command. This command will be intercepted by the disk drive adapter MIR-95 and a BUSY indication will be returned to the host adapter. The disk drive adapter MIR-95 will then determine the correct hard disk drive or drives for the transfer of the information, issue the command or commands to those disk drives and return information from the hard drives to the host adapter. If the command is a single drive command (for example, a READ command), then the disk drive adapter MIR-95 will select the appropriate hard drive and will immediately return status and interrupt information from that hard drive to the host adapter. If the command is a two drive command (for example, a WRITE command), then the disk drive adapter MIR-95 will direct the command to both the first and the second hard drives. In this fashion, information provided by the CPU will be replicated on two disks, thereby providing automatic, substantially simultaneous backup against loss of data. A READ command is an example of what in this context may be referred to as a one drive command, whereas a WRITE command is an example of a two drive command. In other words, information is only read from one drive, whereas information may be written to both drives.

Drive Error

The disk drive adapter MIR-95 is designed so that it can detect a failure in any of the attached drives. By repeatedly checking the status of the drives, it will determine if the status of both the first hard drive and the second hard drive is the same, indicating normal operation. As mentioned above, under normal operation, the status and interrupt information will be returned to the host adapter.

If the status of the two hard drives is not equal, then the disk drive adapter MIR-95 will determine if the error is a fatal error or a recoverable (that is, correctable) error. If the error is determined to be recoverable, then the disk drive adapter MIR-95 will return the status of the failed drive to the host adapter so that the host adapter can take normal corrective measures. If the error is not recoverable, then the disk drive adapter MIR-95 will remove the failed drive from service, switching all disk activities to the working channel and signal the user of a fatal error. In a diagnostic mode the user can rebuild hard drives or determine if all drives are in working condition.

Preferred Embodiment

A typical personal computer in use today has one drive, one controller and a 40/44 pin IDE connector. A primary goal of the present invention is to protect data by writing the data to a second drive. If the first drive fails, then a complete set of data is immediately available on the second drive.

In a preferred embodiment of the present invention this is accomplished by adding an additional hard drive and positioning the disk drive adapter MIR-95 between the existing drive and the new hard disk drive and the 40/44 pin IDE connector. Instead of writing information to only one drive, the same information is written to both drives. The user interface reveals only one of the two drives (unless the user intentionally wants to see both drives). For example, with the disk drive adapter MIR-95 attached to the IDE host connector, a user employing a DOS operating system will see only a "C" prompt, indicating the hard disk drive "C" is specified even though data will be directed to two mirrored hard disk drives. The disk drive adapter MIR-95 performs the function of learning what the host adapter is trying to do (either a READ command or a WRITE command) and directing data to one drive or to both drives. Upon receipt of a WRITE command, the disk drive adapter MIR-95 will write the data coming from the host adapter to both drives. The data will thereby be duplicated simultaneously. Upon receipt of a READ command, the disk drive adapter MIR-95 will choose the drive from which the date will be read. The data is not required to go through the disk drive adapter MIR-95. The disk drive adapter MIR-95 merely selects the drive that will be participating in the READ or WRITE information flow. Processors which could support the activities of a device in accordance with the present invention would include either an 8 or 16 bit processor such as, for example, the Intel 8031 or 80286.

Because an adapter in accordance with the present invention takes data from the IDE host connector, the present invention achieves mirroring without requiring the modification, removal or replacement of the system IDE host controller or the use of specialized mirroring software and/or hardware. The present invention enables the system IDE host controller to remain intact, and simply connects to the IDE host controller while taking information from the IDE host connector. The present invention provides a single piece of hardware which may be used to achieve mirroring in any system using an IDE interface. The present invention thereby eliminates the need to use a different kind of mirroring hardware for every different type of computer interface (ISA, PCI, etc.). The present invention does not require a direct connection to the bus and is not restricted to use with a particular type of bus. Attaching an adapter in accordance with the present invention to the IDE host connector allows the disk drive adapter MIR-95 to monitor all the information being transmitted between the host adapter and the hard disk drive, including READ commands and WRITE commands, because the set of registers A-2 are identical to the set of registers on the hard disk drive.

Figure 3:
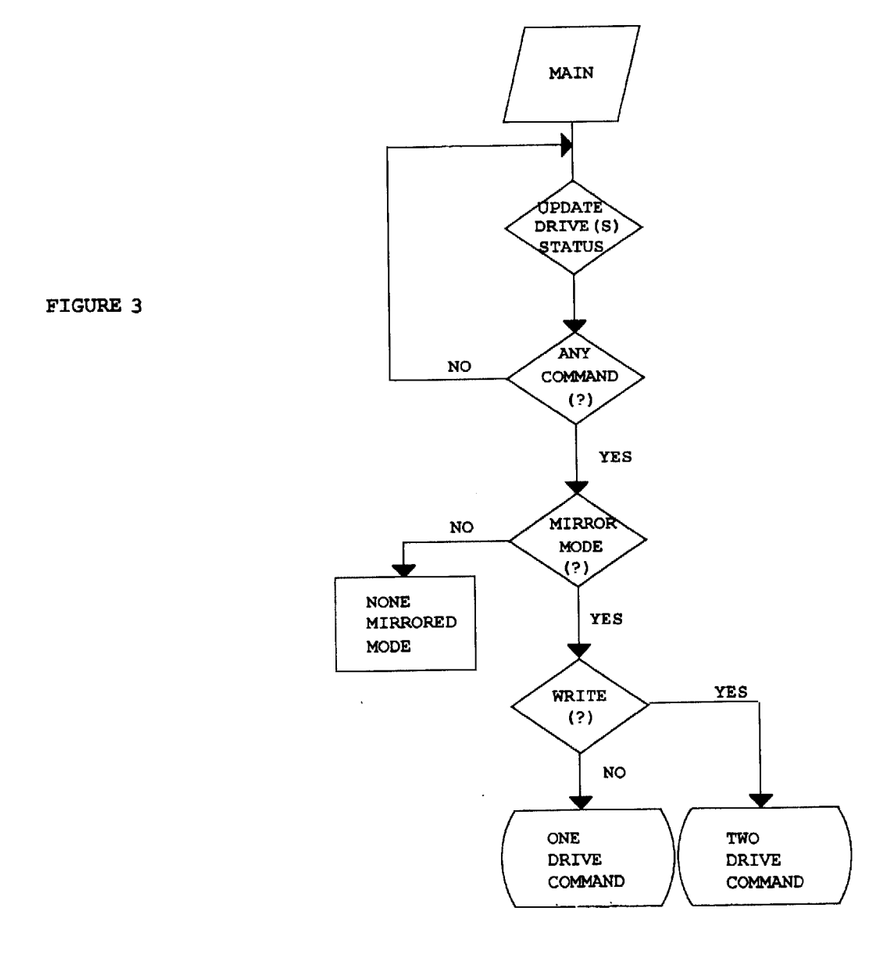
FIG. 3 shows an example of how an adapter in accordance with a preferred embodiment of the present invention may monitor and update the status of the hard disk drives, determining whether the drives are functioning and whether the drives are performing a mirroring function.
Figure 4:
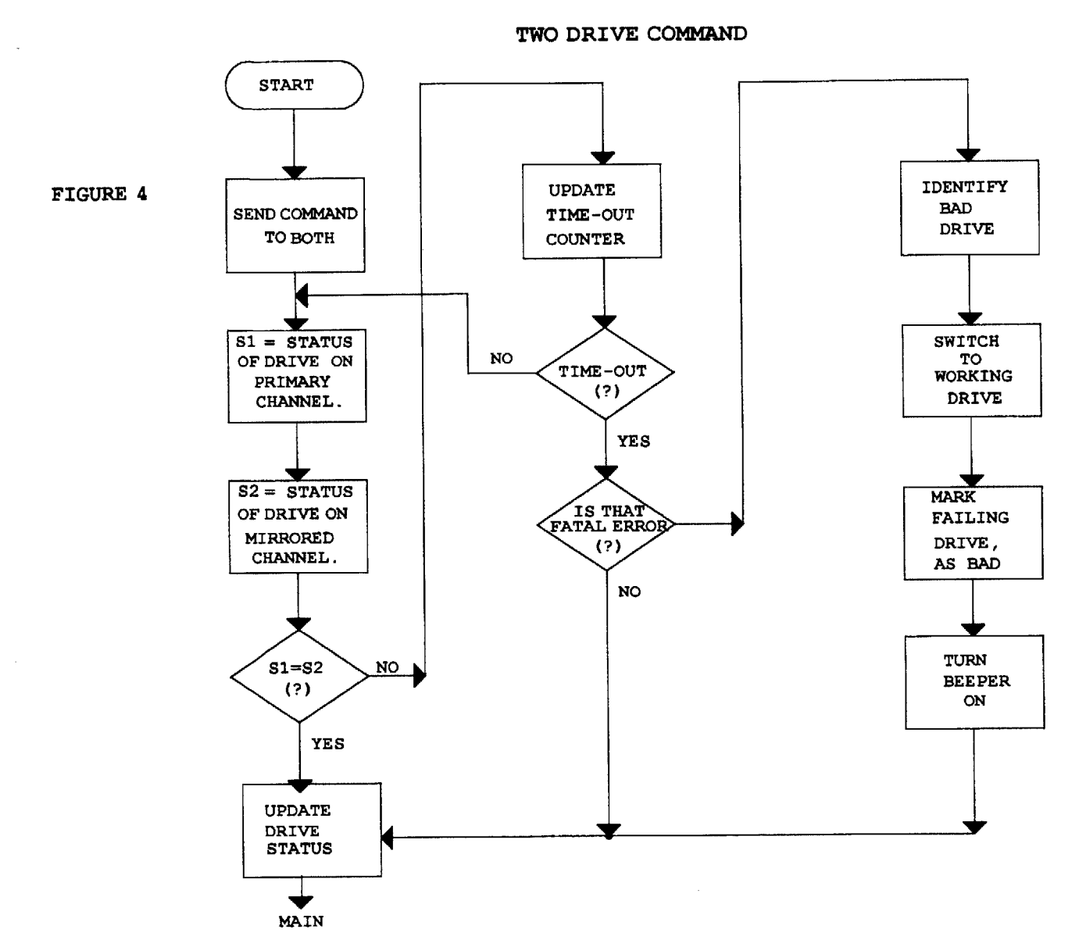
FIG. 4 shows an example of what may occur in a two disk drive system when one of the disk drives is flawed and an attempt is made to write data to both disk drives.
Figure 5:
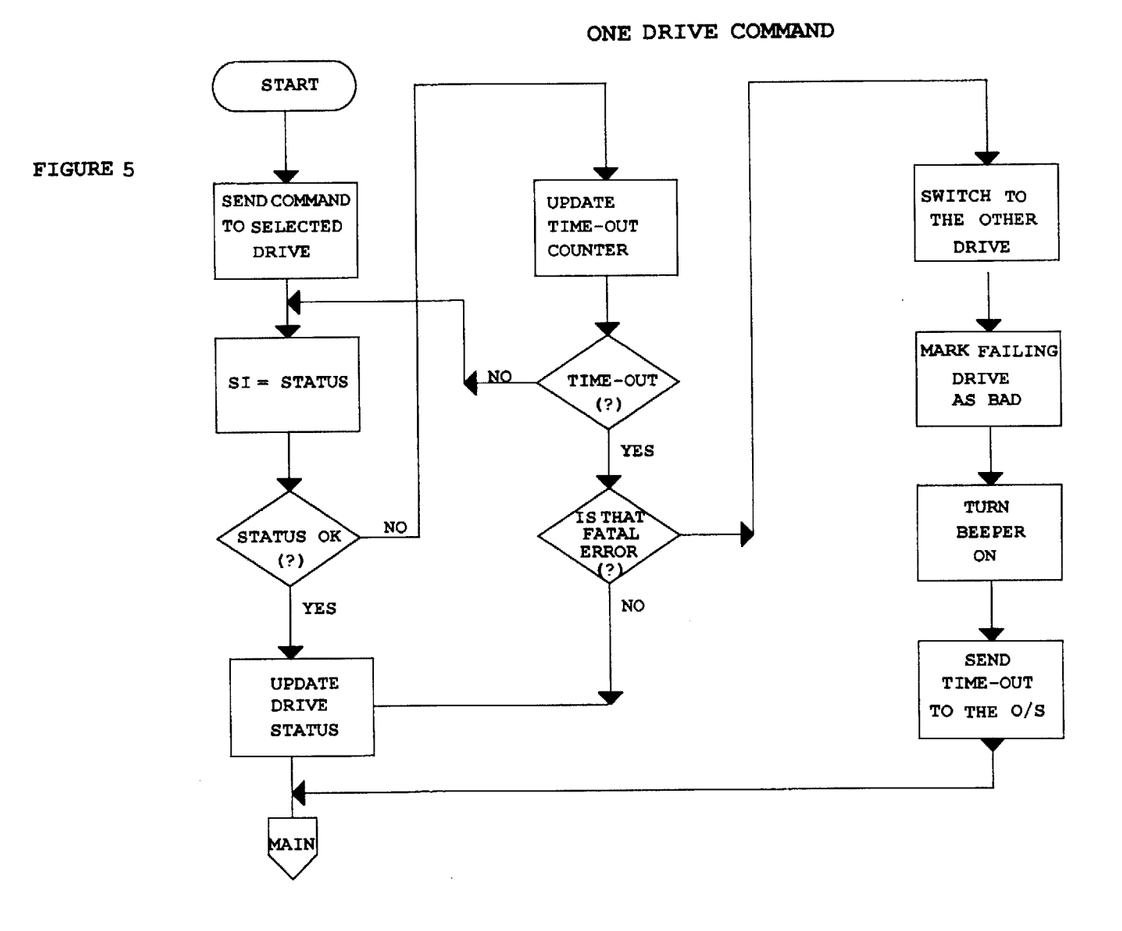
FIG. 5 shows an example of what may happen when an attempt is made to read data from a disk.

The flowcharts shown in FIGS. 3–5 illustrate examples of disk activity and monitoring processes that occur when an adapter in accordance with the present invention is installed in a personal computer. In the illustrated example, the disk drive adapter MIR-95 is attached, on one side, to an IDE connector on the system board or a separate IDE adapter, and on the other side to at least one hard disk drive.

The flowchart illustrated in FIG. 3 shows an example of how the disk drive adapter MIR-95 may monitor and update the status of the hard disk drives, determining whether the drives are functioning and whether the drives are performing a mirroring function. This monitoring function may be performed for READ commands, WRITE commands, or other relevant disk actions. Depending on the number of hard disk drives attached and the related setup, the disk drive adapter MIR-95 can determine whether the system is in a single disk drive mode or a mirrored disk drive mode.

As shown in FIG. 3, when a command (including, for example, a READ command, a WRITE command, or a SEEK command) is issued, a check is made to determine whether the system is operating in a mirror mode (that is, using more than one drive) or in a non-mirror mode (using only one drive). A non-mirror mode might be operative, for example, when one of two or more hard disk drives has failed, or when only one disk drive is present, or when the computer operator has intentionally decided to use only one drive (even though more than one drive may be present).

The disk drive adapter MIR-95 monitors the system to determine which mode the system is in. If the disk drive adapter MIR-95 determines that the system is not in a mirrored disk drive mode, then it essentially functions as a standard IDE adapter. On the other hand, if the disk drive adapter MIR-95 determines that the system is in a mirror mode, then for each WRITE command it will cause the same data to be written to all of the hard drives, rather than to only one hard drive.

The flowchart illustrated in FIG. 4 shows an example of what occurs in a two disk drive system when one of the disk drives is flawed and an attempt is made to write data to both disk drives.

When a WRITE command is issued to the IDE channel, the disk drive adapter MIR-95 monitors the execution of the command and monitors the status of the first and second hard disk drives. Data on each of the first and second hard drives is compared prior to the command to determine whether the data on each drive are the same or different. If the status of both drives is the same, then mirroring is confirmed, both the first and second hard drives are identified as functioning properly, and the same data is written to both drives. On the other hand, if the status of both drives is not equal, then it is assumed that a problem exists and a process is initialized to determine the extent of the problem.

The disk drive adapter MIR-95 then goes to a time-out counter to retry the hard drive status check a predetermined number of times. If, during this time-out check, the disk drive adapter MIR-95 determines that the status of both drives is in fact equal, then it assumes that the problem has been corrected. The disk drive adapter MIR-95 then updates the status of the drives and writes data to both drives in accordance with the standard mirror mode procedure (as previously described).

On the other hand, if the status of the drives remains consistently unequal during the time out check, then it is assumed that a fatal error has occurred and one of the drives is bad. The disk drive adapter MIR-95 may identify which of the two drives is bad by determining which drive is providing feedback and which drive is failing to provide any feedback. The drive providing no feedback is identified as the bad drive.

The disk drive adapter MIR-95 then automatically switches from a mirror drive mode to a single drive mode and turns on an audible alarm which alerts the user to the fact that only one drive is working. The disk drive adapter MIR-95 identifies the non-working drive as the bad drive and prohibits information from being written to or read from the bad drive, switching all commands to the functioning hard disk drive. Apart from this change, the disk drive adapter MIR-95 continues to allow information to be written to and read from the working drive, and the user may continue to work at the computer as if no error had occurred.

The disk drive adapter MIR-95 goes back and updates the status and continues to monitor the one good drive, rather than both the good and bad drives. An attempt may thereafter be made to make the drives equal again, either through software or hardware or by manually repairing or replacing the bad disk drive.

While FIG. 4 shows an example of what may happen in a two disk drive system when an attempt is made to issue a WRITE command, FIG. 5 shows an example of what may happen when an attempt is made to issue a READ command.

The disk drive adapter MIR-95 continuously updates the status of the drives. A READ command may be directed to the single hard disk drive specified by the user during setup as the default drive from which information should be read. If the selected default drive is bad, then the status is updated as bad and the disk drive adapter MIR-95 will switch to the working hard disk drive and turn on an audible alarm. The disk drive adapter MIR-95 will then transfer the time out status to the IDE host adapter or connector causing the IDE host to retry the command to the working hard disk drive.

In one embodiment, an adapter in accordance with the present invention may be used in a computer system that includes an IDE interface controller and a video monitor. The adapter may include means for connecting the adapter to the IDE controller and the video monitor, thereby enabling the adapter to monitor information transmitted via the IDE interface controller. The adapter may also include means for directing selected data from the IDE controller to the video monitor.

In another embodiment, an adapter in accordance with the present invention may be used in a computer system that includes a motherboard and a plurality of additional boards, including an IDE interface controller and a video card or a sound card. The adapter may include means for connecting the adapter to the additional boards, thereby enabling the adapter to monitor information transmitted via the additional boards. The adapter may also include means for directing selected data from the additional boards to a computer peripheral.

In still another embodiment, an adapter in accordance with the present invention may be used in a computer system that includes a motherboard and a plurality of additional boards, including, for example, an IDE interface controller, a video card, a modem card and a sound card. The adapter may include means for connecting the adapter to the additional boards, thereby enabling the adapter to monitor information transmitted via the additional boards. The adapter may also include means for directing selected data from the additional boards to a computer peripheral. The adapter may also include means for directing selected data from the additional boards regardless of bus architecture and operating systems.

Although product names of several specific circuit elements used in preferred embodiments of the present invention have been identified herein, it is recognized that any circuit element chip which performs functions similar or equivalent to the components described here may be substituted with no change in the functionality of the invention. The present invention is therefore not limited to the specific circuit elements identified herein, and changes in such circuit elements may be made to accommodate such considerations as cost reduction, lack of allocation of components, or other reasons.

The presently disclosed embodiments are to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. An adapter for use in a computer system, the computer system including at least an IDE connector, a pre-existing IDE interface controller on a motherboard and a plurality of drives, the adapter comprising:

means for connecting the adapter via the IDE connector simultaneously to both the IDE interface controller and the plurality of drives and for enabling the adapter to monitor information transmitted between the IDE interface controller and the plurality of drives, means for determining whether each of the plurality of drives is serviceable, means for determining whether data on each of the plurality of drives are equal, means for directing identical data to each of the plurality of drives when data on each of the plurality of drives are equal, means for preventing data from being directed to at least one of the plurality of drives when data on each of the plurality of drives are not equal, and means for selecting one of the plurality of drives as a drive from which to read data.

2. The device of claim 1, comprising means for generating an audible alarm when data on each of the plurality of drives are not equal.

3. The device of claim 1 wherein the computer system includes at least one of a 3.5" floppy disk bay and a 5.25" floppy disk bay and wherein the adapter is configured to occupy at least one of the 3.5" floppy disk bay and the 5.25" floppy disk bay.

4. The device of claim 1 wherein the computer system includes an ISA slot and wherein the adapter is configured to be received in the ISA slot.

5. The device of claim 1, wherein the means for connecting the adapter to the IDE interface controller and the plurality of drives comprises a 40/44 pin IDE interface connector.

6. In a computer system including at least an IDE connector, a pre-existing IDE interface controller on a motherboard and a plurality of drives, a method comprising:

providing an adapter, connecting the adapter via the IDE connector simultaneously to both the IDE interface controller and to the plurality of drives, monitoring information transmitted between the IDE interface controller and the plurality of drives, determining whether each of the plurality of drives is serviceable, determining whether data on each of the plurality of drives are equal, directing identical data to each of the plurality of drives when data on each of the plurality of drives are equal, preventing data from being directed to at least one of the plurality of drives when data on each of the plurality of drives are not equal, and selecting one of the plurality of drives as a drive from which to read data.

7. The method of claim 6, comprising the step of generating an audible alarm when data on each of the plurality of drives are not equal.

* * * * *